(12) United States Patent
Köhler et al.

(10) Patent No.: US 11,704,261 B2
(45) Date of Patent: Jul. 18, 2023

(54) SYSTEM AND METHOD FOR ESTABLISHING A DATA CONNECTION BETWEEN A MASTER UNIT AND AT LEAST ONE DEVICE UNIT

(71) Applicant: TURCK Holding GmbH, Halver (DE)

(72) Inventors: Jens Köhler, Chemnitz (DE); Rene Schubert, Chemnitz (DE)

(73) Assignee: TURCK HOLDING GMBH, Halver (DE)

( * ) Notice: Subject to any disclaimer, the term of this patent is extended or adjusted under 35 U.S.C. 154(b) by 103 days.

(21) Appl. No.: 17/369,422

(22) Filed: Jul. 7, 2021

(65) Prior Publication Data

US 2022/0027298 A1   Jan. 27, 2022

(30) Foreign Application Priority Data

Jul. 21, 2020   (DE) .......................... 102020119124.3

(51) Int. Cl.
*G06F 13/20*   (2006.01)
*G06F 13/42*   (2006.01)

(52) U.S. Cl.
CPC .............. *G06F 13/20* (2013.01); *G06F 13/42* (2013.01)

(58) Field of Classification Search
CPC .................................. G05F 13/20; G06F 13/42

(Continued)

(56) References Cited

U.S. PATENT DOCUMENTS

| 6,622,011 B1* | 9/2003 | Joeressen | H04W 88/185 |
| | | | 455/73 |
| 2008/0169907 A1* | 7/2008 | Ootsuka | G08C 17/02 |
| | | | 340/10.1 |

(Continued)

FOREIGN PATENT DOCUMENTS

DE   102016217706 A1   3/2017

*Primary Examiner* — Paul R. Myers (74) *Attorney, Agent, or Firm* — Steven M. Hertzberg (57) ABSTRACT

The invention relates to a system for establishing a data connection between a master unit (M) and at least one device unit (D), wherein the master unit (M) is coupled to a primary coupler unit ($D_{prim}$) and the at least one device unit (D) is coupled to a secondary coupler unit ($D_{sec}$), in each case for electrical power transmission and for data transmission. The primary coupler unit ($D_{prim}$) and the secondary coupler unit ($D_{sec}$) can be coupled for data transmission. A control signal can be received and the system has three operating states that can be activated in dependence on the received control signal. When the first operating state is activated, there is a data connection according to the IO-Link standard between the master unit (M) and the device unit (D). When the second operating state is activated, primary coupler identification data ($D_{prim}$-ID) are allocated to the primary coupler unit ($D_{prim}$), wherein there is a data connection according to the IO-Link standard between the master unit (M) and the primary coupler unit ($D_{prim}$). When the third operating state is activated, secondary coupler Identification date ($D_{sec}$ID) are allocated to the secondary coupler unit ($D_{sec}$), wherein there is a data connection according to the IO-Link standard between the master unit (M) and the secondary coupler unit ($D_{sec}$). The invention furthermore relates to a method for operating the system.

10 Claims, 2 Drawing Sheets

(58) Field of Classification Search
USPC .......................................................... 710/104
See application file for complete search history.

(56) References Cited

U.S. PATENT DOCUMENTS

| | | | |
|---|---|---|---|
| 2015/0121507 A1* | 4/2015 | Haija ..................... | G06F 21/44 726/17 |
| 2017/0264455 A1* | 9/2017 | Ozaki ..................... | H04L 12/40 |
| 2018/0356786 A1* | 12/2018 | Ozaki ..................... | G05B 19/05 |
| 2019/0327662 A1* | 10/2019 | Franz ..................... | H04W 84/20 |
| 2020/0127869 A1* | 4/2020 | Spanjers ........... | H04L 12/40176 |
| 2022/0224574 A1* | 7/2022 | Kataoka ................... | H04Q 9/00 |

* cited by examiner

SYSTEM AND METHOD FOR ESTABLISHING A DATA CONNECTION BETWEEN A MASTER UNIT AND AT LEAST ONE DEVICE UNIT

CROSS REFERENCE TO RELATED APPLICATION

This application claims priority to German patent application No. 102020119124.3, filed Jul. 21, 2020, the content of which is incorporated by reference herein in its entirety.

FIELD OF INVENTION

The Invention relates to a system and method for establishing a data connection between a master unit and at least one device unit. It furthermore relates to a method for establishing a data connection between a master unit and at least one device unit.

BACKGROUND OF INVENTION

In many areas of automation engineering, systems are desired which allow flexible coupling to and decoupling of devices from a control unit. For example, sensors and tools are to be actuated, wherein, however, the wear of individual components or a batch change can make it necessary for example to change a connected device. Furthermore, it is to be possible to use a controller flexibly in different contexts.

In this connection, various problems can occur in known systems. For example, it can happen that distances have to be bridged by means of wires which exceed a maximum permissible length for common communication protocols. Furthermore, so-called couplers, which are used, for example, for data and/or power transmission in a device connection, are known. Customary couplers cannot be utilized as comprehensively as is desirable, for example also to prevent erroneous coupling processes.

In DE 10 2016 217 706 B4 a method for bidirectional data transmission between an IO-Link device and an IO-Link master via an intermediate unit is described.

The object of the invention is to provide a system which makes a flexible connection between various units possible that can be adapted to the requirements of the application context.

SUMMARY

This object is achieved by a system of the type mentioned at the beginning with the features of claim 1. Advantageous embodiments and developments of the invention are specified in the dependent claims.

In the system for establishing a data connection between a master unit and at least one device unit, the master unit is coupled to a primary coupler unit and the at least one device unit is coupled to a secondary coupler unit, in each case for electrical power transmission and for data transmission. The primary coupler unit and the secondary coupler unit can be coupled for data transmission. A control signal can be received. The system has three operating states that can be activated in dependence on the received control signal, wherein, when the first operating state is activated, there is a data connection according to the IO-Link standard between the master unit and the device unit. When the second operating state is activated, primary coupler identification data are allocated to the primary coupler unit, wherein there is a data connection according to the IO-Link standard between the master unit and the primary coupler unit. When the third operating state is activated, secondary coupler identification data are allocated to the secondary coupler unit, wherein there is a data connection according to the IO-Link standard between the master unit and the secondary coupler unit.

This advantageously allows a direct communication between the master unit and the various components of the system, for instance in order to adapt configurations or in order to control the setting up of the connection.

Primary and secondary coupler units can be coupled to each other in the invention for data transmission. In a further embodiment, primary and secondary coupler units of the system can furthermore be coupled for electrical power transmission. The coupling of the primary and secondary coupler units for power and/or data transmission can in particular be effected wirelessly.

In a further embodiment of the system, the primary and secondary coupler units of the system can be coupled wirelessly for electrical power transmission and for data transmission.

In known systems, on the other hand, it is usually provided that at least one of these functions is achieved by a wire-based coupling. The wireless coupling can be effected in various ways. A power transmission is obtained in particular by means of an inductive coupling. A data connection can be established, for example, via an inductive coupling, near-field communication, Bluetooth or Wi-Fi. Different variants of a method, for example variants of the Bluetooth standard, can, for example, be used to adjust the power consumption, range, security and other properties of the data connection.

Through the wireless coupling, both a mechanical and a galvanic isolation between master unit and device unit is achieved and the connection of the master unit to the device unit or to different device units can be established particularly easily, free from wear and flexibly.

In particular when the first operating state is activated, the system can furthermore solve problems with latencies during the signal transmission, in that the primary and secondary coupler units provide a data communication between the respectively connected devices. Because there are data connections both between the master unit and the primary coupler unit and between the secondary coupler unit and the device unit, the data connection can also be established between master unit and device unit, for example. In this way, an IO-Link connection which would be impossible to establish or unstable in the case of a direct coupling between master unit and device unit due to latencies and/or routes that are too long can, for example, be established.

In other words, a connection, in particular an IO-Link connection, between master unit and device unit can be established here such that the combination of primary and secondary coupler units behaves like an extended cable. As the IO-Link standard provides for only one cable as connection medium, the system can thus establish the desired connection. In particular, in the first operating state, the coupler units are themselves not "visible" and are addressed neither by the master unit nor by the device unit as separate devices.

In the case of the data connection, the units involved are addressed by means of respectively allocated identification data, for instance on the basis of an identification code. For example, in the case of a data connection, in particular by means of IO-Link, the units involved in the system are allocated a "Device-ID" or "Master-ID" and a 'Vendor-ID'. In particular, in the first operating state, the primary coupler unit can be addressed by means of identification data which correspond to the identification data of the device unit—this connection therefore corresponds to a direct connection to the device unit, at least from the point of view of the master unit. Furthermore, in particular in the first operating state, the secondary coupler unit is identified by means of identification data which correspond to the identification data of the master unit as opposed to the connected device unit—this connection therefore corresponds to a direct connection to the master unit, at least from the point of view of the device unit. The primary and secondary coupler units are thereby effectively "Invisible" in particular to the connected master and device units. In order now to actually be able to establish an IO-Link connection between the master unit and the device unit, the primary and secondary coupler units are coupled to each other—in particular for a wireless data and power transmission—and set up such that the signals received by the respectively connected unit are relayed to the other coupler unit, from where the signals are then forwarded to the further unit which is connected to the other coupler unit.

An Implementation can be provided, in which the IO-Link connection between master unit and device unit is established by means of two separate IO-Link connections, namely on the one hand between master unit and primary coupler unit and on the other between secondary coupler unit and device unit. However, the system is explicitly not limited to such an implementation, but rather the connection can also be established in a different way, in particular as a direct IO-Link connection between master unit and device unit. The connection can also be set up in a different way than via IO-Link.

When the second or third operating state of the system is activated, the master unit can then be data-connected to the primary coupler unit or to the secondary coupler unit, respectively, for instance via an "IO-Link" connection. In particular, in the third operating state, the connection of the master unit to the secondary coupler unit is established via the primary coupler unit.

These connections that can be established in the second and third operating states extend the system in comparison with the connection between master unit and device unit otherwise provided, to the extent that the coupler units can now be accessed for example directly, for instance in order to read data at this point, to make settings or to control a data connection of one of the coupler units to further units.

In order to be able to establish the IO-Link connections, the units involved in the connection are in particular assigned their own identification data, on the basis of which they are addressed in the case of the data connection or by means of which they are identified as opposed to other units. In particular, the primary coupler identification data allocated to the primary coupler unit in the second operating state can be different from the device identification data of the device unit D. It is thereby ensured that the master unit establishes its communication connection to the primary coupler unit and not to the device unit. Furthermore, in particular in the third operating state, the secondary coupler identification data allocated to the secondary coupler unit can differ from the primary coupler identification data and the device identification data of the device unit.

The operating states could be activated in different ways, for instance automatically triggered by particular conditions or events, for instance when primary and secondary couplers are disconnected, or switches could be provided which activate a particular one of the states.

In the system, the activation of the different operating states is effected on the basis of a control signal. This control signal is received in particular by the master unit, but it can alternatively or additionally be received by another unit of the system. The control signal can furthermore be sent by the master unit to the primary and/or secondary coupler unit and received there.

The control signal can be generated in different ways, for instance automatically in a disconnection process, in which a connection between two units of the system is interrupted, or in a connection process, in which a connection between two units of the system is established. The control signal can furthermore be triggered in dependence on a user's input or another operator control action; the control signal is formed in particular in dependence on the input or the operator control action, with the result that a user can trigger different control signals. An operator control action can for instance comprise actuating a switch.

In one embodiment of the system, the primary coupler unit and the secondary coupler unit are formed as structurally separate units. It is in particular provided here that the two coupler units are not encompassed by a single intermediate unit. As a result, the system components can advantageously be changed particularly easily and the field of use of the system is widened.

In a further embodiment, the primary coupler unit and the secondary coupler unit of the system can be formed in a common structural unit.

In a further embodiment, the coupling of the master unit to the primary coupler unit and/or the coupling of the device unit to the secondary coupler unit is via a wired connection. This advantageously makes a particularly simple and reliable connection between the master unit and the primary coupler unit or between the secondary coupler unit and the device unit possible.

In particular, a "copper-based" connection or "copper interface" is referred to here, whereas the wireless coupling is effected via an "air interface". As already explained above for the wireless connection, various methods and standards can also be utilized for the wired connection, depending on the application and context.

In a development, the system is set up to detect a coupling state between the primary coupler unit and the secondary coupler unit and to activate the first, second or third operating state in dependence on the detected coupling state. The operating state can thereby advantageously be adapted to the current configuration of the system.

The detection of the coupling state can be effected in different ways known per se. For example, a closed or open state of a circuit can be detected. Furthermore, a request signal can be sent and where necessary a response signal can be received.

For example, a connected and a disconnected coupling state can be defined. In particular, a connected coupling state is detected if there is a data connection and/or a connection for power transmission, individually or in combination, between the primary and secondary coupler units; conversely, a disconnected coupling state can be detected if there is no such connection or only one of the two connection types. A disconnected coupling state can furthermore be detected if one of the coupler units is deactivated or switched off, wherein a deactivation of a particular module or a particular functionality of the coupler unit can also be sufficient for this.

The detection of the coupling state can, for example, be effected by the primary coupler unit and the detected coupling state can be transmitted to the master unit.

When a new operating state is activated, it can in particular be provided that the primary coupler unit causes a termination of an IO-Link connection of the master unit to the device unit and/or a termination of a data connection to the secondary coupler unit, in order subsequently to establish a new IO-Link connection of the master unit to another unit of the system depending on the newly activated operating state.

In one embodiment, the system is set up to activate the second operating state after a disconnected coupling state has been detected between the primary coupler unit and the secondary coupler unit, and/or the system is set up to activate the third operating state after a connected coupling state has been detected between the primary coupler unit and the secondary coupler unit, and/or the system is set up to activate the first operating state after a connected coupling state has been detected between the primary coupler unit and the secondary coupler unit and a coupling to the device unit has been detected. The activated operating state is thereby advantageously chosen such that the connections available in each case are utilized within the units connected in the system.

The activation of an operating state can in particular be initiated by the master unit. It can be provided that the master unit assigns new identification data to a connected further unit in dependence on the operating state that is activated or is to be activated or alters an addressing utilized in the case of the data connection in dependence on the activated operating state.

In particular, in the second operating state there is a connection, for instance an IO-Link connection, between the master unit and the primary coupler unit. This second operating state can, for example, be activated if a disconnection of the connection, in particular of the data connection, between primary and secondary coupler units occurs or If no secondary coupler unit is present or it is, for example, completely or partially deactivated. The second operating state can in this case remain activated until, for example, a particular time interval has expired, until a connection to the primary coupler unit is established, until particular configuration steps are completed and/or until a particular control signal is detected.

In particular, in the third operating state there is a connection, for instance an IO-Link connection, between the master unit and the secondary coupler unit, wherein this connection is established in particular via the primary coupler unit. This third operating state can, for example, be activated if a disconnection of the connection, in particular of the data connection, between secondary coupler unit and device unit occurs or if no device unit is present or it is, for example, completely or partially deactivated. The third operating state can in this case remain activated until, for example, a particular time interval has expired, until a connection to the device unit is established, until particular configuration steps are completed and/or until a particular control signal is detected.

Furthermore, the third operating state can be activated if a connection is established between the primary coupler unit and the secondary coupler unit, in particular also if an active device unit is connected to the secondary coupler unit. This means that, after the secondary and primary coupler units have been connected, the secondary coupler unit can first of al be addressed directly and for example configured, wherein it can furthermore be provided that in this operating state the device unit is not yet addressed by the master unit.

In particular, in the first operating state there is a connection, for instance an IO-Link connection, between the master unit and the device unit, wherein this connection is established in particular via the primary and secondary coupler units. This first operating state can, for example, be activated if the whole chain of connections between master unit, primary and secondary coupler units and device unit is connected. The first operating state can, if this coupling state is detected, for example be activated immediately or its activation can be delayed until, for example, a particular time interval has expired, until particular configuration steps are completed and/or until a particular control signal is detected.

In a further embodiment, when the first operating state is activated, the primary coupler unit and/or the secondary coupler unit is set up to receive a first signal and to perform a first data comparison on the basis of the received first signal, in dependence on the result of the first data comparison, to either relay the first signal immediately or to receive a further signal within a predefined time interval, to carry out a further data comparison and to relay the first and further signal in dependence on the further data comparison. This advantageously ensures that, in the case of the data connection, a targeted addressing of particular units can be performed and at the same time disturbances and/or misdirected addressing of signals are avoided.

In particular, the primary coupler unit and/or the secondary coupler unit receives the first signal from the master unit.

In the data comparison, the identification data of the units and devices connected in the system are in particular taken into account.

Difficulties in the clear addressing can, for example, occur when in an IO-Link connection a device unit from a third-party manufacturer is used, the so-called "Vendor ID" of which differs from the corresponding "Vendor ID" data of the coupler units. A signal, in particular a control command, to such a device unit may possibly be interpreted by the coupler units as a control command directed to them. Furthermore, other configurations can arise in which an erroneous actuation can occur.

In the data comparison, a received signal will in particular compared with a predefined quantity of comparison signals. If the received signal corresponds to one of the comparison signals, the relaying is delayed. During this delay, further signals arriving are checked for whether they are control signals for the coupler unit. If this is not the case, the signals can be relayed, otherwise the relaying can be dispensed with and the unit can be actuated by the received control signal. A predefined length of a time interval can, for example, be defined for the delay. Furthermore, the delay can last until a following signal is received. In particular, a maximum duration until the signal is relayed can be defined.

In the method, a plausibility check is in particular provided in which a signal received by a coupler element is checked with regard to the unit of the system to which a control signal possibly present is directed.

In a development, when the second operating state is activated, the primary coupler unit can be configured by the master unit, and/or when the third operating state is activated, the secondary coupler unit can be configured by the master unit. The units of the system can thereby advantageously be configured.

Various types of configurability of the coupler units of the system can be provided.

In one embodiment, when the second and/or third operating state is activated, a pairing of primary coupler unit and secondary coupler unit can be performed. It can thereby advantageously be defined between which coupler units a coupling can be carried out.

The configurability of the coupler units is an essential prerequisite in order to make the pairing possible. In particular, one or more secondary couplers can be permanently assigned to one primary coupler. That is to say a connection only comes about when the defined primary and secondary sides are present. It is thus ensured that an incorrect device does not unintentionally connect to the system and cause errors in the installation. This possibility is not provided in known systems as methods without the possibility of pairing are used in particular to establish the data connection, for instance in order to be able to use the couplers more flexibly or in order to guarantee a simpler handling.

On the other hand, it can be ensured with the aid of the pairing that a tool changer does not use arbitrary tools, but rather only defined units. A mechanical coding can also be provided as an alternative to this pairing step, but this reduces the flexibility of the system. For example, if a defined service life of a tool is exceeded or noticeable problems with quality increasingly occur, this tool can be blocked on the software side by the pairing.

Furthermore, it can, for example, be checked whether a device unit provided through the pairing is coupled to the system, in particular in order to implement a protection against forgery or plagiarism or in order to monitor the use of a licensed device unit.

In a further embodiment, when the second and/or third operating state is activated, a reading of device data of the primary coupler unit and/or of the secondary coupler unit can be performed by the master unit M, and/or when the second and/or third operating state is activated, a setting of at least one device parameter of the primary coupler unit and/or of the secondary coupler unit can be performed by the master unit. This advantageously allows direct access to data of the coupler units.

For example, the reading of device data can be utilized in order to recognize risks of failure at an early stage, for instance in order to improve the resilience of an installation. Through a data connection to the coupler units and access to data of the data recorded and/or stored there, a current operating temperature, the number of excess temperature events or the number of shutdowns due to excess current can for example be detected. Characteristic values or parameters for assessing the quality of the data connection or information on the currently installed firmware of the units can alternatively or additionally be detected.

In one embodiment, device parameters are set during the configuration of the primary and/or secondary coupler unit. For example, data of the coupler unit can be displayed, in particular if a device unit is coupled to the system. Thus, the configuration can for example be effected such that the behavior of a display element of the coupler unit, for instance one or more LEDs and/or a display, is controlled.

Furthermore, a switching output of a coupler unit can be configurable. Various states can for example be configured, for instance a "direct transmission of the output state of the device unit", "signaling of excess temperature", "signaling of foreign objects in the field of the power transmission" or "direct output of a switch bit from the process data by means of a display element".

Furthermore, the actuation of a display element can be configured, for instance for one or more LEDs of the primary and/or secondary coupler unit: for example, various states can be configured, for instance a "display of the IO-Link connection state (standard)". "display of errors in the coupler", "display of errors in the device (error events)" or"display of the state of the switching output". In particular, a triggering event and/or a parameter for the respective output behavior can be configured individually for several LEDs, for instance by means of inversion, continuous illumination, flashing rhythm or color.

In a further example, a threshold value can be set in the configurability. This can be utilized in particular in order to recognize and optionally deal with problems or errors in the wireless power transmission between the coupler units. Furthermore, a sensitivity for a current measurement or a foreign object recognition can for example be set. The behavior of a foreign object recognition can for example be adapted to the requirements of the respective operational environment via corresponding parameters. In order to prevent faulty activations. For example, the definition of a nominal current for a coupled device unit can serve to improve the reliability of a foreign object recognition, wherein permissible operating limits are already restricted in advance and the influence of foreign objects on the wireless power transmission is better recognized. Furthermore, the wireless power transmission, in particular by inductive coupling, can be optimized for a specific application. Furthermore, the power transmission can be tested and monitored.

Furthermore, a particular power output can be set by configuring the coupler units and a higher operating temperature can be made possible by limiting the transmitted power output.

The configuration the data transmission or output functions of the system can furthermore be implemented in the so-called standard IO mode.

The invention furthermore relates to a system module with a master unit which is coupled to a primary coupler unit for electrical power transmission and for data transmission, wherein the system module is set up to be coupled to a secondary coupler unit in the above-described manner and to be used in a system of the above-described type.

The invention furthermore relates to a system module with a device unit which is coupled to a secondary coupler unit for electrical power transmission and for data transmission, wherein the system module is set up to be coupled to a primary coupler unit in the above-described manner and to be used in a system of the above-described type.

The invention furthermore relates to a master module for use in a system of the above-described type.

In the method for operating a system with a master unit and at least one device unit, a control signal is received and, in dependence on the received control signal, one of three activatable operating states of the system is activated. When the first operating state is activated, a data connection according to the IO-Link standard is established between the master unit and the device unit. When the second operating state is activated, primary coupler identification data are allocated to a primary coupler unit, wherein a data connection according to the IO-Link standard is established between the master unit and the primary coupler unit, and when the third operating state is activated, secondary coupler identification data are allocated to a secondary coupler unit, wherein a data connection according to the IO-Link standard is established between the master unit and the secondary coupler unit.

The method is in particular formed to operate the system. It therefore has the same advantages as the device according to the invention.

BRIEF DESCRIPTION OF THE DRAWINGS

The invention is explained in more detail below with reference to the attached drawings. There are shown in.

DETAILED DESCRIPTION OF THE EMBODIMENTS

Figure 1:
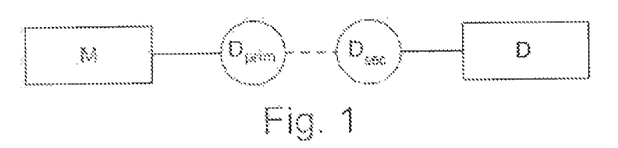
FIG. 1 depicts an embodiment example of the system.

An embodiment example of the system is explained with reference to FIG. 1.

The system comprises a master unit M and a device unit D. In the embodiment example, the master unit M comprises a central control unit M; in the example, a sensor or a tool is provided as device unit D. The master unit M and the device unit D are formed here such that they can be coupled via an IO-Link connection.

The system is used for automation control in a manufacturing plant.

In further embodiment examples, other elements can be provided which can be coupled via an IO-Link connection.

The system furthermore comprises a primary coupler unit Dprim and a secondary coupler unit Dsec. In the embodiment example, these are formed as separate units.

The master unit M is coupled to the primary coupler unit Dprim via a wired transmission line for the transmission of data and electrical power. Analogously thereto, the device unit D is coupled to the secondary coupler unit Dsec via a further wired transmission line for the transmission of data and electrical power.

The primary coupler unit Dprim and the secondary coupler unit Dsec are furthermore formed so that they can be coupled wirelessly. A wireless connection for the data and power transmission can be established here. In the example, a protocol known per se, for instance Bluetooth, is used for the wireless data transmission. Furthermore, an inductive coupling is provided for the power transmission.

The embodiment example of the system with different operating states activated is explained with reference to FIGS. 2A to 2C. The embodiment example of the system explained above is taken as the starting point.

Figure 2A:
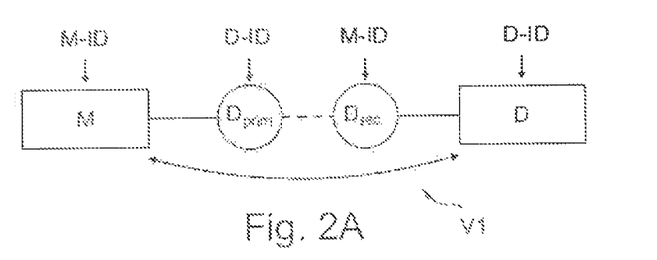
FIG. 2A depicts an embodiment example of the system with first operating state activated.

In the case shown in FIG. 2A, the first operating state of the system is activated. There is a data connection according to the IO-Link standard between the master unit M and the device unit D. For this, master identification data M-ID are allocated to the master unit M and device identification data D-ID are allocated to the device unit D. The primary coupler unit Dprim and secondary coupler unit Dsec are coupled to each other and configured such that they relay signals between the master unit M and device unit D and make it possible to establish a connection according to the IO-Link standard. The corresponding data connection V1 between master M and device D is indicated as an arrow.

Figure 2B:
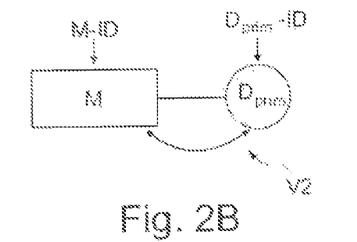
FIG. 2B depicts an embodiment example of the system with second operating state activated.

In the case shown in FIG. 2B, the second operating state of the system is activated. There is a data connection according to the IO-Link standard between the master unit M and the primary coupler unit Dprim. For this, master identification data M-ID are allocated to the master unit M and primary coupler identification data Dprim-ID are allocated to the primary coupler unit Dprim. Via the transmission line between master unit M and primary coupler unit Dprim, a data connection V2 according to the IO-Link standard is established, which is indicated as an arrow.

Figure 2C:
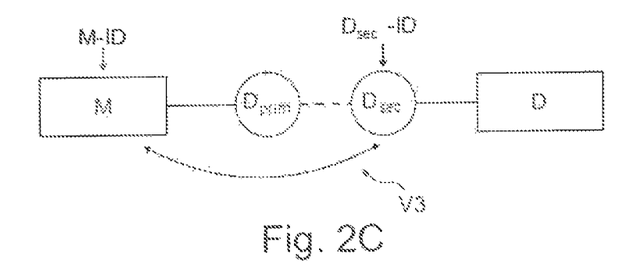
FIG. 2C depicts an embodiment example of the system with third operating state activated.

In the case shown in FIG. 2C, the third operating state of the system is activated. There is a data connection according to the IO-Link standard between the master unit M and the secondary coupler unit Dsec. For this, master identification data M-ID are allocated to the master unit M and secondary coupler identification data Dsec-ID are allocated to the secondary coupler unit Dsec. The primary coupler unit Dprim and secondary coupler unit Dsec are coupled to each other and configured such that they relay signals between the master unit M and the secondary coupler unit Dsec and make it possible to establish a connection according to the IO-Link standard. The corresponding data connection V3 between master M and secondary coupler unit Dsec is indicated as an arrow.

The changing of the operating states of the system can be effected in different ways, as explained by way of example below. Reference is made here to FIGS. 1 and 2A to 2C described above.

First of all, the case of the second operating state V2 shown in FIG. 2B, in which the master unit M is connected to the primary coupler unit Dprim, is taken as the starting point. Here, primary coupler identification data Dprim-ID, which make a direct addressing via an IO-Link connection possible, are assigned to the primary coupler unit Dprim. In the embodiment example, the primary coupler identification data Dprim-ID comprise a Vendor-ID and a Device-ID, which are in each case allocated to the primary coupler unit Dprim Itself. In the embodiment example it is provided that the second operating state V2 is activated when the system with the master unit M and the primary coupler unit Dprim is put into operation, in particular if no secondary coupler unit Dsec is connected.

If the secondary coupler unit Dsec is now connected, a change to the third operating state V3 can be effected automatically, as shown for instance in FIG. 2C. In the embodiment example it is provided that the device unit D is not activated and is, for example, switched off. However, it can also be provided that whenever the primary coupler unit Dprim and secondary coupler unit Dsec are newly connected a change to the third operating state V3 is first effected, for instance for a particular time interval, in order first to make direct access to the secondary coupler unit Dsec possible, before the device unit D is accessed.

Secondary coupler identification data Dsec-ID, which here likewise comprise a Vendor-ID and a Device-ID which are in each case allocated to the secondary coupler unit Dsec itself, are assigned to the secondary coupler unit Dsec.

In the change from the second to the third operating state, the Device-ID of the secondary coupler unit Dsec is assigned to the primary coupler unit Dprim, with the result that the primary coupler unit Dprim is effectively "invisible" to the connected master unit M. The primary coupler unit Dprim is configured such that, in this operating state, it relays the signals and control commands of the master unit M to the secondary coupler unit Dsec, and vice versa. In this case, the master unit M thus no longer accesses the primary coupler unit Dprim directly, but rather the secondary coupler unit Dsec is accessed directly.

A further change to the first operating state V1 is effected, for instance automatically when a device unit D is connected or activated. A direct connection between the master unit M and device unit D is established, in particular a connection according to the IO-Link standard. The primary coupler unit Dprim and secondary coupler unit Dsec are now configured such that they transmit the data between the master unit M and device unit D, without themselves being part of the network and without themselves being directly addressed.

For this, in the embodiment example, the device identification data D-ID, which in particular comprise a Vendor-ID and a Device-ID, are assigned to the primary coupler unit Dprim. This means that the IO-Link connection of the master unit M to the primary coupler unit Dprim "looks" to the master unit M like a direct connection to the device unit D. In a similar manner, the master identification data M-ID are assigned to the secondary coupler unit Dsec, with the result that the IO-Link connection of the device unit D to the secondary coupler unit Dsec "looks" to the device unit D like a direct connection to the master unit M.

In the embodiment example, a particular control signal is furthermore defined, by means of which a change from the first operating state to one of the further operating states is triggered. If this control signal is sent by the master unit M and received by the primary coupler unit Dprim and/or secondary coupler unit Dsec, first a termination of the existing IO-Link connection will caused and the identification data of the coupler units Dprim, Dsec involved are newly allocated. Then, the desired operating state is activated and a new IO-Link connection is set up.

Figure 3:
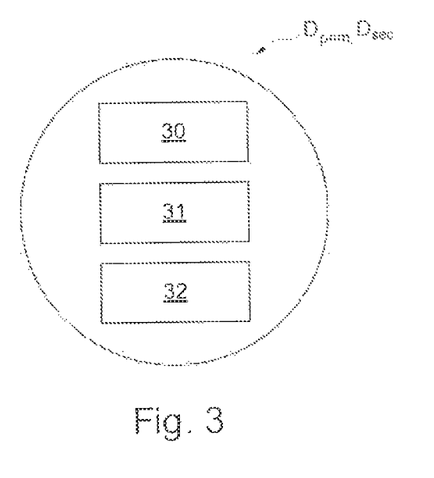
FIG. 3 depicts an embodiment example of a primary or secondary coupler unit.

The structure of an embodiment example of a primary or secondary coupler unit is explained with reference to FIG. 3. The representation is schematic and applicable in essentially the same way to the primary coupler unit Dprim and secondary coupler unit Dsec of the embodiment example of the system explained above.

The coupler unit Dprim, Dsec has a display element 30, a detection module 31 and a configuration module 32.

In the embodiment example, the display element 30 comprises one or more light emitting diodes (LEDs). The display element 30 can actuate these light emitting diodes in dependence such that they emit light signals. In particular, this actuation is effected in dependence on a control signal which the display element 30 receives.

The light signals can be distinctive in various ways known per se and for instance exhibit a brightness, color or dynamic light change such as flashing. An item of information can hereby be output, for instance as a warning signal when a threshold value, for instance of a temperature or an electrical power output, is exceeded. Furthermore, an operating and/or connection state for the coupler unit Dprim, Dsec, a connected further unit M, D and/or the system as a whole can be output.

In further embodiment examples, the display element 30 comprises, as an alternative or in addition to the LEDs, a display or another display area, for example with a segment display or a pixel matrix, by means of which a graphic output can be effected. In further embodiment examples, the display element 30 alternatively or additionally comprises another means for outputting a signal, for instance for outputting an acoustic signal.

The detection module 31 is set up to detect various operating parameters of the coupler unit Dprim, Dsec. For example, the operating parameters can relate to a data and/or power transmission between the coupler elements Dprim, Dsec. They can furthermore relate to a temperature parameter, a data rate, an operating and/or connection state for the coupler unit Dprim, Dsec, a connected further unit M, D and/or the system as a whole.

In the embodiment example, a configuration module 32 of the coupler unit Dprim, Dsec is furthermore provided, which is set up so that the coupler unit Dprim, Dsec can be configured. For this, the configuration module 32 can comprise a memory unit for storing configuration parameters, furthermore it can also comprise a monitoring element which allows a data communication for making the configuration settings. In particular, a configuration can be effected by establishing a data connection of the coupler unit Dprim, Dsec to the master unit M; in the process, configuration parameters of the coupler unit Dprim, Dsec can be read and/or altered.

In the embodiment example, a pairing can for example be carried out by means of the configuration module 32. It is defined here to which units the coupler unit Dprim, Dsec can establish a connection, in particular a data connection. For example, it can be defined to which further coupler units Dprim, Dsec a connection can be established. Furthermore, it can be defined to which master M and/or device D units a connection can be established.

In the embodiment example, a behavior of the display element 30, in particular a behavior of the LEDs, can, for example, furthermore be set by means of the configuration module 32. For example, the light parameters thereof can be configured for the output of a data connection, a transmitted power output and/or data rate, particular temperature values and/or excess temperature events, a connection and/or operating state or other parameters.

In the embodiment example, a transmitted and/or maximum transmissible electrical power output between primary coupler unit Dprim and secondary coupler unit Dsec can, for example, furthermore be set by means of the configuration module 32.

LIST OF REFERENCE NUMBERS

M master unit
D device unit
$D_{prim}$ primary coupler unit
$D_{sec}$ secondary coupler unit
M-ID master identification data
D-ID device identification data
$D_{prim}$-ID primary coupler identification data
$D_{sec}$-ID secondary coupler identification data
V1 data connection (first operating state)
V2 data connection (second operating state)
V3 data connection (third operating state)
30 display element
31 detection module
32 configuration module

What is claimed is:

1. A system for establishing a data connection between a master unit (M) and at least one device unit (D), wherein the master unit (M) is coupled to a primary coupler unit ($D_{prim}$) and the at least one device unit (D) is coupled to a secondary coupler unit ($D_{sec}$), in each case for electrical power transmission and for data transmission; wherein the primary coupler unit ($D_{prim}$) and the secondary coupler unit ($D_{sec}$) can be coupled for data transmission; wherein a control signal can be received; and the system has three operating states that can be activated in dependence on the received control signal; wherein when the first operating state is activated, there is a data connection according to the IO-Link standard between the master unit (M) and the device unit (D);

when the second operating state is activated, primary coupler identification data ($D_{prim}$-ID) are allocated to the primary coupler unit ($D_{prim}$), wherein there is a data connection according to the IO-Link standard between the master unit (M) and the primary coupler unit ($D_{prim}$); and when the third operating state is activated, secondary coupler identification data ($D_{sec}$-ID) are allocated to the secondary coupler unit ($D_{sec}$), wherein there is a data connection according to the IO-Link standard between the master unit (M) and the secondary coupler unit ($D_{sec}$).

2. The system according to claim 1, wherein the primary coupler unit ($D_{prim}$) and the secondary coupler unit ($D_{sec}$) are formed as structurally separate units.

3. The system according to claim 1, wherein the coupling of the master unit (M) to the primary coupler unit ($D_{prim}$) and/or the coupling of the device unit (D) to the secondary coupler unit ($D_{sec}$) is via a wired connection.

4. The system according to claim 1, wherein the system is set up to detect a coupling state between the primary coupler unit ($D_{prim}$) and the secondary coupler unit ($D_{sec}$); and to activate the first, second or third operating state in dependence on the detected coupling state.

5. The system according to claim 4, wherein:
the system is set up to activate the second operating state after a disconnected coupling state has been detected between the primary coupler unit ($D_{prim}$) and the secondary coupler unit ($D_{sec}$); and/or
the system is set up to activate the third operating state after a connected coupling state has been detected between the primary coupler unit ($D_{prim}$) and the secondary coupler unit ($D_{sec}$); and/or
the system is set up to activate the first operating state after a connected coupling state has been detected between the primary coupler unit ($D_{prim}$) and the secondary coupler unit ($D_{sec}$) and a coupling to the device unit (D) has been detected.

6. The system according to claim 1, wherein
when the first operating state is activated, the primary coupler unit ($D_{prim}$) and/or the secondary coupler unit ($D_{sec}$) is set up to receive a first signal and to perform a first data comparison on the basis of the received first signal;
in dependence on the result of the first data comparison, to either relay the first signal immediately or to receive a further signal within a predefined time interval, to carry out a further data comparison and to relay the first and further signal in dependence on the further data comparison.

7. The system according to claim 1, wherein
when the second operating state is activated, the primary coupler unit ($D_{prim}$) can be configured by the master unit (M); and/or
when the third operating state is activated, the secondary coupler unit ($D_{sec}$) can be configured by the master unit (M).

8. The system according to claim 1, wherein when the second and/or third operating state is activated, a pairing of primary coupler unit ($D_{prim}$) and secondary coupler unit ($D_{sec}$) can be performed.

9. The system according to claim 1, wherein when the second and/or third operating state is activated, a reading of device data of the primary coupler unit ($D_{prim}$) and/or of the secondary coupler unit ($D_{sec}$) can be performed by the master unit (M); and/or
when the second and/or third operating state is activated, a setting of at least one device parameter of the primary coupler unit ($D_{prim}$) and/or of the secondary coupler unit ($D_{sec}$) can be performed by the master unit (M).

10. A method for operating a system with a master unit (M) and at least one device unit (D), the method comprising the step of:
receiving a control signal; and
in dependence on the received control signal, activating one of three activatable operating states of the system; wherein
when the first operating state is activated, establishing a data connection according to the IO-Link standard between the master unit (M) and the device unit (D);
when the second operating state is activated, allocating primary coupler identification data ($D_{prim}$-ID) to a primary coupler unit ($D_{prim}$), wherein a data connection according to the IO-Link standard is established between the master unit (M) and the primary coupler unit ($D_{prim}$); and
when the third operating state is activated, allocating secondary coupler identification data ($D_{sec}$-ID) to a secondary coupler unit ($D_{sec}$), wherein a data connection according to the IO-Link standard is established between the master unit (M) and the secondary coupler unit ($D_{sec}$).

* * * * *